United States Patent [19]

Goff et al.

[11] Patent Number: 4,596,952
[45] Date of Patent: Jun. 24, 1986

[54] METHOD USING PROXIMITY SENSOR MOUNTED ON ROTATABLE SHAFT FOR DETERMINING TURBINE SEAL CLEARANCE

[76] Inventors: John G. Goff, 941 Fariston Dr., Drexel Hill, Pa. 19026; George W. Johnson, Jr., 2 Cambridge Rd., Downingtown, Pa. 19335

[21] Appl. No.: 487,354

[22] Filed: Apr. 25, 1983

Related U.S. Application Data

[63] Continuation-in-part of Ser. No. 461,190, Jan. 26, 1983, abandoned.

[51] Int. Cl.⁴ .................... G01B 7/14; G01R 35/00
[52] U.S. Cl. ........................... 324/207; 33/542; 73/1 J; 324/202; 324/219; 364/571
[58] Field of Search ........ 324/202, 207, 208, 219–221, 324/173, 174; 33/174 M, 174 PA, 174 Q, 178 E, 542, 543; 73/623, 633, 660, 661, 1 R, 1 J; 364/561, 571

[56] References Cited

U.S. PATENT DOCUMENTS

| | | | |
|---|---|---|---|
| 2,684,464 | 7/1954 | Hastings et al. | 324/220 |
| 3,363,321 | 1/1968 | Youngblood . | |
| 3,419,797 | 12/1968 | Libby | 324/220 |
| 3,436,836 | 4/1969 | Metevia . | |
| 3,780,442 | 12/1973 | Gresho . | |
| 3,869,800 | 3/1975 | Bartlett et al. . | |
| 4,083,423 | 4/1978 | Williams et al. | 324/174 X |

FOREIGN PATENT DOCUMENTS

| | | | |
|---|---|---|---|
| 0037464 | 3/1977 | Japan | 324/207 |
| 0565105 | 7/1977 | U.S.S.R. | 73/1 J |

*Primary Examiner*—Gerard R. Strecker
*Attorney, Agent, or Firm*—Paul & Paul

[57] ABSTRACT

A method and apparatus for measuring precise distances between the turbine shaft and the inner cylinder is disclosed. A mandrel carrying proximity transducers is placed inside the inner cylinder and rotated to preselected points. A proximeter sends a voltage to the transducers and the voltage drop from the transducers to the preselected points on the inner surface of the inner cylinder is measured. Then, the top halves of the turbine are installed and voltage drop for the same points is recorded. A computer compares the voltages and converts the difference into engineering units to allow determination of the "sag" in the turbine spindle that will be introduced when the complete turbine is assembled.

2 Claims, 8 Drawing Figures

METHOD USING PROXIMITY SENSOR MOUNTED ON ROTATABLE SHAFT FOR DETERMINING TURBINE SEAL CLEARANCE

CROSS-REFERENCES

This application is a continuation-in-part of application Ser. No. 06/461,190, filed on Jan. 26, 1983, and now abandoned.

BACKGROUND OF THE INVENTION

This invention relates to a method and apparatus for measuring the clearance between the spindle of a turbine and the stationary parts therein. More particularly, the method and apparatus will determine the required distance between the centerline of the spindle and the stationary parts to prevent damaging rubbing from occuring during operation.

The turbines used to generate electricity are comprised of a high pressure component and a low pressure component. The high pressure component consists of a super pressure turbine and a high pressure turbine which have a common spindle that extends beyond the high pressure turbine into the generator component located at that end. The total spindle is made up of three separate shaft sections, one for each turbine and one for the generator, which form a continuous shaft with bearings located at each end of each section.

In the super pressure turbine, the various turbine blades rotate within circumferential grooves in the inner cylinder, which inner cylinder carries fixed blades with stationary sealing elements provided therebetween to seal steam leakage. The stationary sealing elements, or packing gland seals, are fixed inside seal holders in the inner cylinder, and fit next to, and have very close clearances with, packing segments on the spindle. Clearances between the sealing elements and the packing segments must be in the order of 0.030 inches to prevent damage through contact between the two. When the inner and outer cylinders are assembled around the spindle, these clearances must be precisely controlled to prevent the stationary sealing elements from wiping against and damaging the packing segments. This is also the case for the clearance required at the inner gland seals at each end of the turbine, and any wiping of the sealing grooves on the spindle by the fixed inner gland seals will result in damage to the spindle. Minor wipes cause leakage which reduces efficiency, while major wipes will cause extesive damage to the spindle.

Whenever a super pressure turbine is scheduled for an overhaul, many problems can surface. If, for example, inspection of the existing seals shows an unusual wear pattern on certain seals, this would indicate that there is misalignment between the rotating spindle and the stationary parts. Correction of this problem requires major realignment of the stationary parts with respect to each other and to the spindle. In this case, major realignment refers to both a stationary parts alignment, i.e. the outer cylinder with gland packing carriers and the inner cylinder with stationary blade rings and a balance piston seal carrier, with respect to each other, and a coupling alignment. During the stationary parts alignment, the position of each of these parts must be measured with respect to the centerline of the spindle. These measurements are taken with the top halves of the turbine on and bolted tight (called tops-on readings) in order to eliminate cylinder sag and out of roundness. The measurement procedure normally also requires a set of readings be taken with tops-off for comparison purposes.

Heretofore, the measurements required to perform a major alignment were obtained by either optical methods or direct measurement. In either case, both tops-on and tops-off readings are taken. The optical methods included use of either the Farand scope, which is similar to a transit, or, when the turbine is large enough, a laser beam and targets mounted in the bore of each stationary part with readings being taken by line of sight. The direct measurement method is also only used when the turbine is large enough and accomplished by means of a tight wire (a 16 gauge piano wire tensioned by a 30 pound weight) placed on the turbine center and with a machinist or other individual crawling inside the turbine and taking readings to measure the distance from the wire to the bore of each stationary part with a micrometer.

In certain instances, when for example a Farand scope is not available or the turbine is too small, as with the super pressure turbine, boiler feed pump drive turbine or reactor feed pump drive turbine, for a machinist to crawl around inside with the tight wire or to allow positioning of the targets for the laser scope, none of the known methods are adequate and a new method and apparatus must be devised to allow the alignment readings to be obtained.

SUMMARY OF THE INVENTION

A method and apparatus for measuring the clearances between points on the inner surface of the inner cylinder and the center-line of the spindle of a turbine are disclosed. The top half of the inner cylinder is removed and a mandrel, or dummy shaft, inserted in place of the spindle in the spindle setting and correctly aligned in the couplings using known procedures. Along this shaft, at the longitudinal positions of the seal holders, proximity probes having transducers at the ends are positioned to measure, through a series of readings, the gap from the top of the transducer to the bottom of each seal holder keyway. With the turbine housing tops-off, the mandrel is rotated to each of the three, six and nine o'clock positions and electrical readings, corresponding to the gap, are read and recorded. Then, the complete inner and outer cylinders are bolted together, and the shaft rotated through the same set of points and the twelve o'clock position. Readings at each point are made and a computer converts all readings to engineering units to allow the physical amount of cylinder sag to be computed. The required machining of individual seal holders is then accomplished to prevent any future wiping of the seals on the real spindle once the turbine is operated.

It is therefore an object of this invention to provide an apparatus that will allow precise clearances to be set inside the inner cylinder of a turbine.

It is a further object of this invention to provide an apparatus that will allow exact clearances to be set between the moving and stationary parts inside the inner cylinder of a turbine.

It is a still further object of this invention to provide a method to set exact clearances between the moving and stationary parts inside the inner cylinder of a turbine.

Other objects and advantages of the present invention will be readily apparent to those skilled in the art by reading the following brief description of the figures, detailed description of the preferred embodiment and the appended claims.

DESCRIPTION OF THE PREFERRED EMBODIMENT

Figure 1:
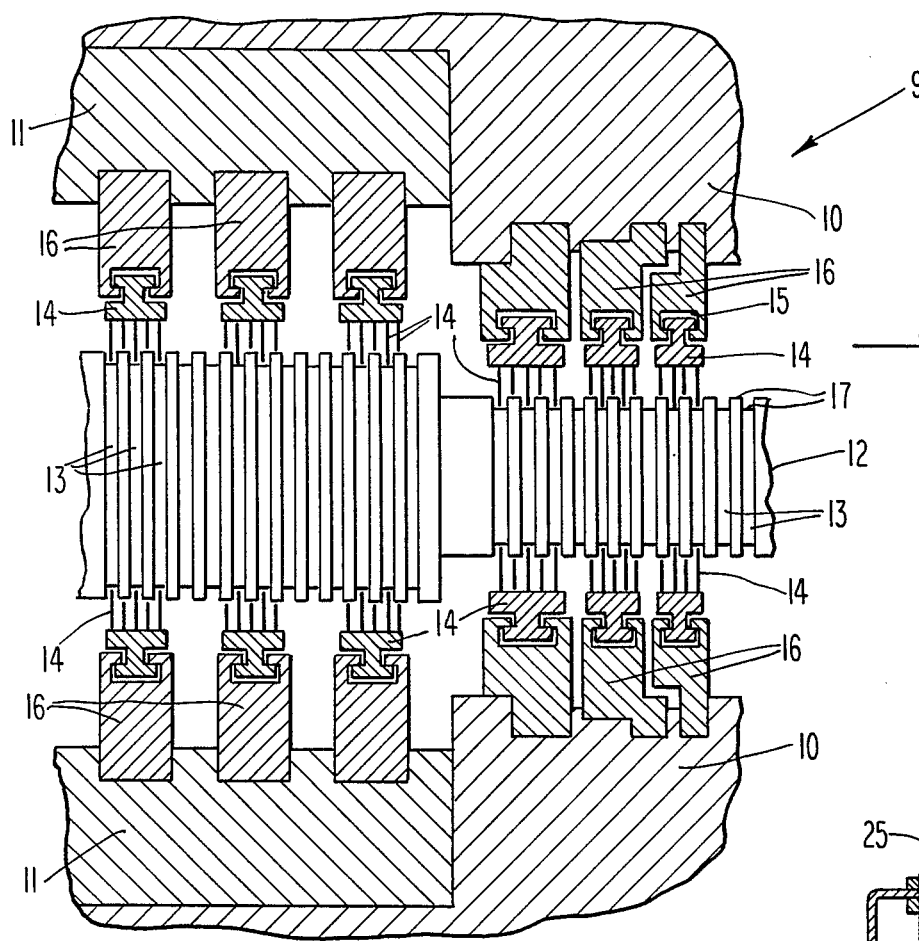
FIG. 1 shows a partial fragmentary view of the inside of a high-speed turbine.

Reference is now made to the figures wherein FIG. 1 shows a fragmentary cross-sectional view of a typical turbine housing 9. Turbine 9 has an outer cylinder 10 surrounding an inner cylinder 11 with a super pressure spindle 12 extending through the high pressure (on the left) and super pressure (on the right) turbines. Spindle 12 carries a plurality of appropriately sized packing segments 13 in the respective pressure turbines. Adjacent segments 13, in extremely close tolerance thereto, are a corresponding number of packing gland seals 14. Seals 14 extend from inside keyways 15 in seal holders 16, to a position just adjacent to segments 13 so as to prevent any steam from escaping through the sections of the turbine. Seals 14 are machined to obtain desired tolerances as will be discussed below, and are made of 316 stainless steel. Seal holders 16 are made of chromium-molybdenum-vandium steel.

Figure 3:
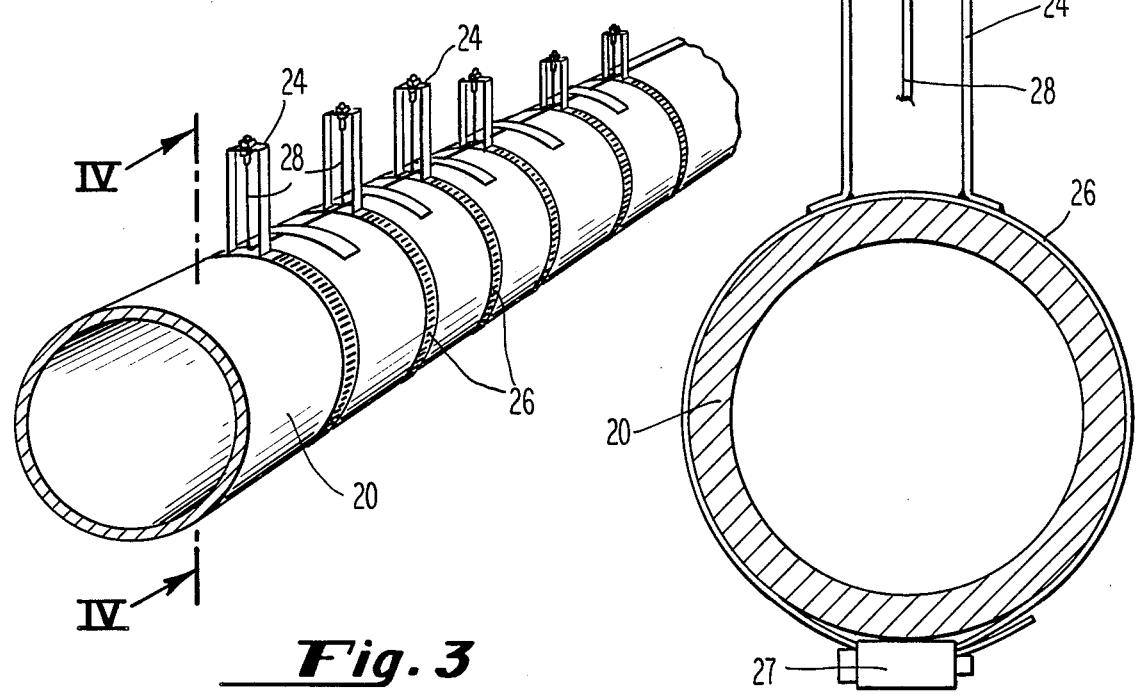
FIG. 3 shows an isometric view of the dummy measuring shaft.
Figure 4:
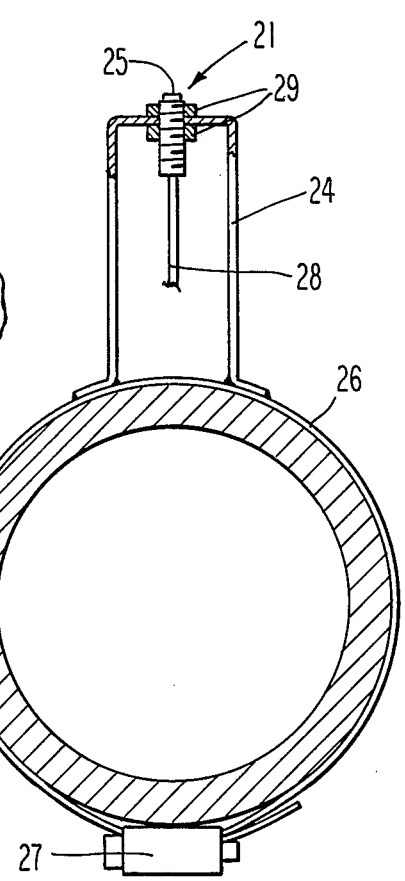
FIG. 4 is a cross-sectional view taken along lines IV—IV of FIG. 3.
Figures 2, 4A:
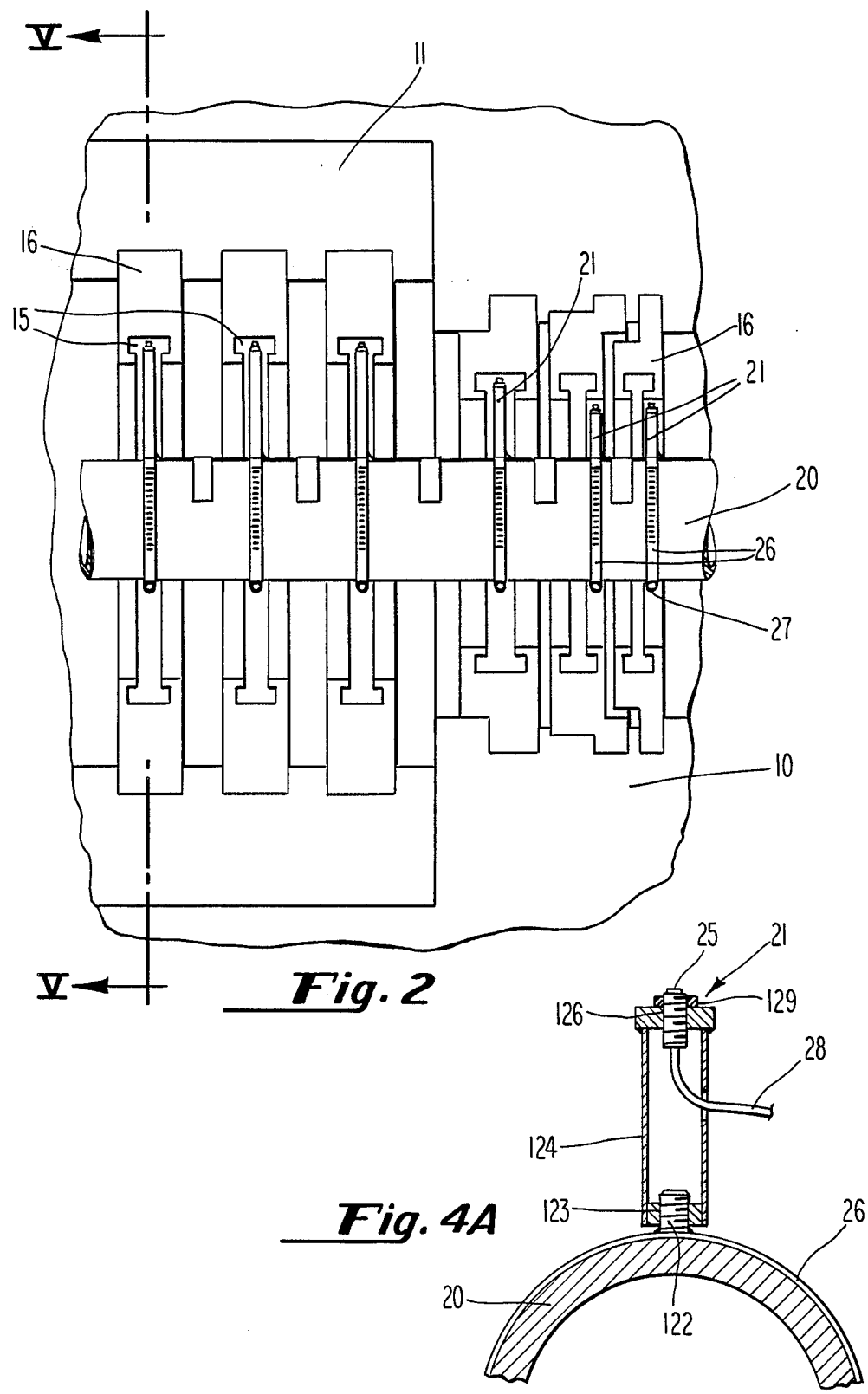
FIG. 2 shows a plan view of the inner cylinder with the dummy shaft and transducers in place.
FIG. 4A is an alternative embodiment of the invention.

FIG. 2 shows a plan view of the tops-off, opened, inner cylinder 11 with the invention herein disclosed installed for operation. As can be seen from that figure a mandrel or dummy shaft 20 is installed in place of spindle 12 and has a plurality of proximity probes 21 securely affixed thereto as by metal belts 26. FIGS. 3, 4 and 4A give a clearer view of the above-described assembly.

As seen in FIGS. 3 and 4, one method of attaching probes 21 to mandrel 20 is by a mounting bracket such as metal legs 24. Legs 24 are made of any fairly strong metal and are securely attached to belts 26 as for example by welding at predetermined distances along mandrel 20. Belts 25 are secured by adjustable rack and pinion clamps 27. A transducer 25 is fitted into a hole in the portion of the mounting bracket bridging legs 24 and secured by locking nuts 29. FIG. 4A shows an alternate way of affixing probes 21 to mandrel 20 wherein the mounting bracket is a hollow metal tube 124 and is at its bottom end screwed onto stud 122 at first tapped hole 123. Stud 122 is securely fixed to belts 26 at predetermined distances along mandrel 20, and transducer 25 is fitted into second tapped hole 126 and secured by locking nut 129 at the top end of tube 124.

Figure 7:
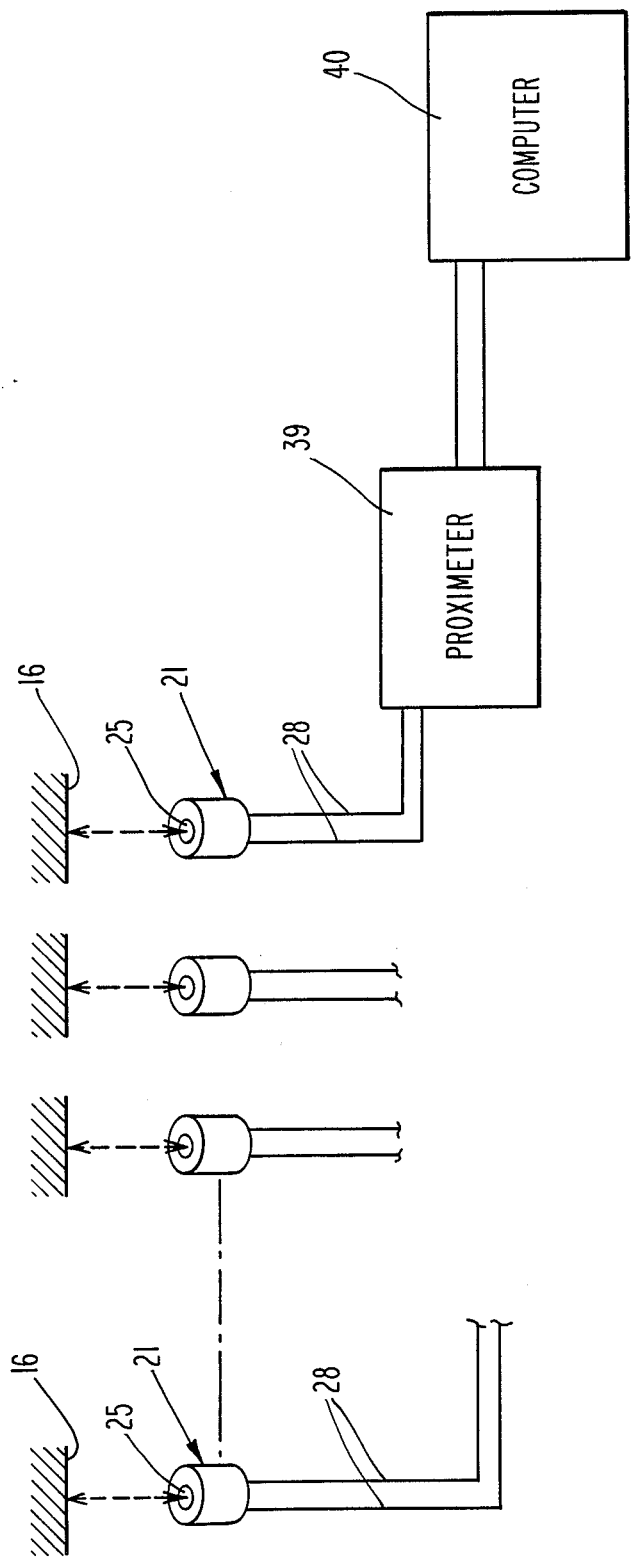
FIG. 7 is a schematic representation of the invention.

In both instances, wires 28 lead from transducers 25 to a proximeter 39 and a computer 40 as shown in FIG. 7 to complete the system. As is known in the eddy current proximity sensor art, the proximeter generates a radio frequency electromagnetic field which is radiated in the immediate area of proximeter/transducer 25. When this electromagnetic field is intercepted by a conductive material, such as the stationary parts of inner cylinder 11, eddy currents are generated in the material. This results in an energy loss in the strength of the return signal, which loss is detected by the transducer and converted into a linear output by computer 40.

In initial attempts to achieve a workable system of the present invention, it was attempted to attach proximity/transducer 25 to wire hoops that would, in turn, be placed around the turbine spindle in between the various stages. This would arrange the transducers to position them within their useful distance from the target stationary part, or within a range of 20 to 60 mils for the components selected. Within this useful distance, a linear relationship exists between the voltage and the distance between the probe and the target. Bentley-Nevada proximity/transducer with the smallest diameter possible to allow placement between the turbine blades, and a liner range of 0.050 inch, were used. Before the above-described arrangement was actually tried, it was concluded that using the spindle and wire hoops would not allow the measuring system to work because of the difficulty in attaching the probes to the spindle and in routing the wiring out of the turbine. These problems are solved by the hereindisclosed invention.

Mandrel 20 is made of six inch pipe with machined journals and a simulated coupling. Use of mandrel 20 eliminated spindle sag, permitted ease of placement and adjustment of probes 21 and resulted in easy wiring.

Figure 5:
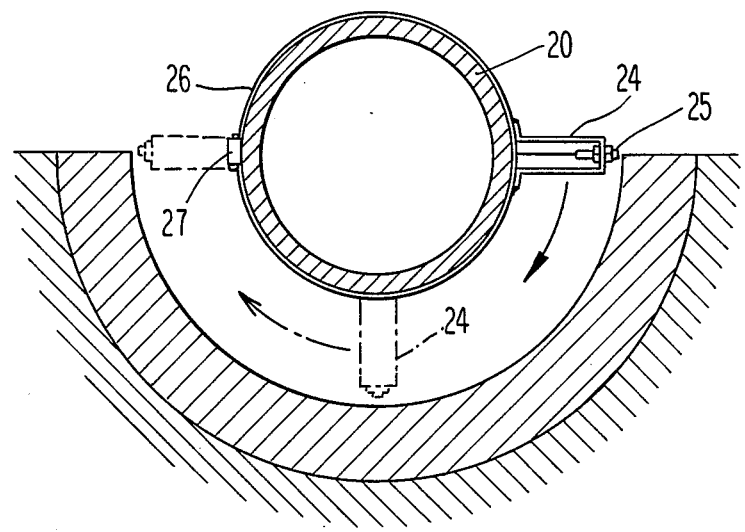
FIG. 5 is a cross-sectional taken along lines V—V of FIG. 2.
Figure 6:
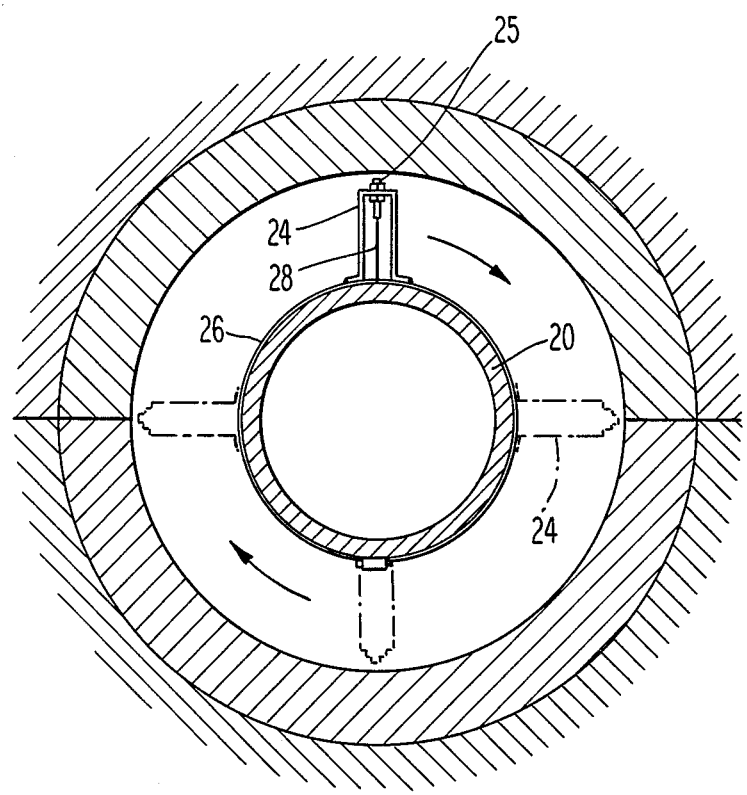
FIG. 6 is a cross-sectional view, similar to FIG. 5, of the dummy shaft inside the assembled turbine.

FIGS. 5, 6 and 7 illustrate the method of using mandrel 20 with probes 21 attached at predetermined places along the length thereof to correspond to individual seals 16. After removing the turbine inner and outer shells, and spindle, mandrel 20 is placed in turbine 9 and aligned to the very high pressure-high pressure coupling. Probes 21 are adjusted on legs 24 or tube 124 and proximity/transducer 25 calibrated to register distances from 0.000 up to an estimated 0.080 inches. This estimate must be made because of the indeterminate amount of movement that the upper or top half of the cylinder shell causes to a spindle when it is bolted in place. During the invention herein described, it has been learned that the voltage capacity of the proximity/transducer used must be capable of providing readings that correspond to more than 60 thousandths of an inch. To achieve this, a transducer similar to the Bentley-Nevada probe/transducer Model No. 21500-00-40-10-02 is used.

The calibration of each probe/transducer is accomplished by constructing a calibration curve with entries based on changes in position of the transducer away from the surface in increments of 10/1000ths of an inch. The corresponding voltage for each position is recorded and the calibration curve for each transducer then allows the computer to convert a voltage reading in millivolts to engineering units or thousandths of an inch for that transducer.

Once probes 21 are adjusted and proximity/transducer 25 calibrated, a set of tops-off readings are taken at the three, six and nine o'clock positions by rotating mandrel 20 a quarter of a turn by hand. Then the top halves inner cylinder, blade rings, gland carriers and outer cylinder (all not shown) are installed and bolted down. Now a complete set of tops-on readings are taken and the difference between the tops-off and tops-on sets calculated. This difference provides the cylinder sag correction required and directs the amount of machining necessary for each seal 16. As a final check, another set of tops-off readings are taken to prove repeatability.

What is claimed is:

1. A method for determining the required clearance for the shaft of a turbine from preselected points on the inner walls thereof comprising the steps of:
   a. separating the inner and outer housings of the turbine;
   b. removing the turbine spindle from its setting;
   c. replacing the turbine spindle with a rotatable shaft having at least one proximity/transducer capable of detecting distances within a predetermined range, extending from said rotatable shaft a predetermined distance, said proximity/transducer being electrically connected to a recording device;
   d. rotating said shaft and recording a first set of electrical readings sent by said proximity transducer as said proximity/transducer is halted at preselected points on the inner walls;
   e. assembling and bolting down said inner and outer housings;
   f. rotating said shaft and recording a second set of electrical readings sent by said proximity/transducer after said proximity/transducer is halted at said preselected points;
   g. comparing said first set of readings with said second set of readings to determine appropriate adjustments to be made to the turbine spindle setting when the turbine spindle is replaced.

2. A method as in claim 1 wherein said predetermined range is convertible to a range of engineering units of from 0.000 inches to 0.080 inches.

* * * * *